Patented July 9, 1929.

1,719,867

UNITED STATES PATENT OFFICE.

WILLIAM C. ARSEM, OF SCHENECTADY, NEW YORK, ASSIGNOR TO COMMERCIAL SOLVENTS CORPORATION, OF TERRE HAUTE, INDIANA, A CORPORATION OF MARYLAND.

PROCESS FOR THE PRODUCTION OF CARBON MONOXIDE.

No Drawing.  Application filed April 27, 1925.  Serial No. 26,305.

This invention relates to the production of carbon monoxide from mixtures of carbon dioxide and hydrogen, and pertains more specifically to the production of carbon monoxide from the mixture of gases evolved during the butyl-acetonic fermentation of carbohydrates.

In the manufacture of butyl alcohol and acetone by the fermentation of carbohydrate materials there is evolved a gas containing approximately 45% of hydrogen and 55% of carbon dioxide, both by volume. Small amounts of butyl alcohol, ethyl alcohol, and acetone may also be present in the gaseous mixture due to entrainment of the solvents from the fermenting mash during gas evolution.

The principal object of my invention is to provide a process for the production of carbon monoxide in pure form from various gas mixtures of hydrogen and carbon dioxide, particularly from butyl fermentation gases. Other objects of my process and invention will become apparent.

While fermenter gases—per se—may be employed in my process, in the case of fermenter gases it is advisable, for the sake of economy, to first remove the volatile solvents. These solvent vapors may be readily removed from the gaseous mixture by passing the gases through suitable "scrubbing towers" or "absorbing towers" such as are well known and much used in the art.

To produce pure carbon monoxide from fermenter gases in accordance with my invention and process, it is necessary to adjust the relative quantities of carbon dioxide and hydrogen in the fermenter gas so that the two substances are present in molecular proportions and may combine according to the following chemical equation:

$$CO_2 + H_2 = CO + H_2O$$

without a residue or excess of either of the gases.

The correct molecular relationship for the production of carbon monoxide from carbon dioxide and hydrogen is in the ratio of twenty-two pounds of carbon dioxide to one pound of hydrogen, whereas, fermenter gas, per se, contains about twenty-six pounds of carbon dioxide for each pound of hydrogen. Accordingly, if pure carbon monoxide is to be prepared from the mixture, without leaving a residuum of carbon dioxide, it is necessary to remove some carbon dioxide from the fermenter gas before the reaction occurs.

The gaseous mixture may, in any event, be readily adjusted to the proper ratio of carbon dioxide and hydrogen by passing the gaseous mixture through, or in contact with pure water at elevated pressures which will dissolve the excess carbon dioxide and may also serve to absorb solvent vapors at the same time.

Fermenter gas, in its original state, or modified in its carbon dioxide content so as to secure an exact ratio of carbon dioxide and hydrogen, is suitable for employment in my process for the production of carbon monoxide.

In accordance with my invention and process, the gaseous mixture is passed into a heated zone whereupon at certain temperatures the carbon dioxide and hydrogen react to form water and carbon monoxide in accordance with the following equation:—

$$CO_2 + H_2 \rightleftarrows CO + H_2O$$

The equlibrium constant for this reaction is expressed by the equation:

$$K = \frac{(H_2O)(CO)}{(CO_2)(H_2)}.$$

The value of K increases with the temperature, so that the percentage of carbon monoxide formed in the mixture becomes greater as the temperature rises. At 1000° C., K=0.234 and the gas mixture contains about 16.3% of carbon monoxide.

While a temperature higher than 1000° C. will produce a gas mixture which, at equilibrium, will contain more than 16.3% of carbon monoxide, I prefer to employ temperatures of the range 1000–1200° C. and to enrich the gas mixture with carbon monoxide by disturbing the equilibrium of the reversible reaction hitherto indicated.

This equilibrium may be disturbed by removing the water vapor as fast as it is formed in the reaction. As the water is removed, the reaction equilibrium is disturbed, and more and more carbon monoxide is formed.

Thus, in accordance with my invention, it is possible to prepare gaseous mixtures which may contain from 16% to 100% of carbon monoxide by alternately heating and cooling the gaseous mixture. This alternate heating and cooling must occur in rapid succession to be effective, for unless rapid temperature changes are effected, particularly on cooling, the equilibrium will be disturbed and some of the previously formed carbon monoxide and water will react again to form carbon dioxide and hydrogen.

I have discovered, further, that the reaction of carbon dioxide and hydrogen to form carbon monoxide is accelerated by certain catalytic agents, notably by metals, their oxides, and carbonates. In general, however, any hydrogenation catalyst is suitable and this may be employed in conjunction with a "promoter" which stimulates and increases the catalyst activity. For example, combinations of iron promoted by uranium, or cerium oxide promoted by thorium oxide are suitable. These catalysts are employed by simple contact with the gaseous mixture.

The rapid alternate heating and cooling of the gas may be accomplished in various types of apparatus. For example, the gaseous mixture may be passed through an apparatus or tube containing a multiplicity of heating elements and cooling elements against which the gaseous mixture alternately impinges. At each heating element some carbon monoxide is formed, and at each cooling element some water is condensed and removed, whereby the equilibrium is disturbed, so that at the next contact with heat more carbon monoxide is formed. A suitable apparatus for the performance of the process is described in my co-pending application, Serial No. 28,350, filed May 6th, 1925. However my invention and process is not dependent on any specific type of apparatus.

Now, having fully described my invention, I claim the following as new and novel:—

1. A process for the production of carbon monoxide which consists in rapidly heating the gas evolved from the butyl-acetonic fermentation of carbohydrates to about 1000–1200° C., rapidly cooling the gaseous mixture to below 100° C. whereby the water formed in the reaction is condensed, and removing the condensed water.

2. A process for the production of carbon monoxide which consists in rapidly heating the gas evolved from the butyl-acetonic fermentation of carbohydrates to about 1000–1200° C., rapidly cooling the gaseous mixture to below 100° C. whereby the water formed in the reaction is condensed, removing the condensed water and continuing rapidly the alternate heating and cooling of the gaseous mixture for the further production of carbon monoxide.

3. A process for the production of carbon monoxide which consists in rapidly heating a gaseous mixture containing approximately twenty-two pounds of carbon dioxide per pound of hydrogen to about 1000–1200° C., rapidly cooling the gaseous mixture to below 100° C. whereby the water formed in the reaction is condensed, and removing the condensed water.

4. A process for the production of carbon monoxide which consists in rapidly heating a gaseous mixture containing approximately twenty-two pounds of carbon dioxide per pound of hydrogen to about 1000–1200° C., rapidly cooling the gaseous mixture to below 100° C. whereby the water formed in the reaction is condensed, removing the condensed water, and continuing rapidly the alternate heating and cooling of the gaseous mixture for the further production of carbon monoxide.

5. A process for the production of carbon monoxide which consists in rapidly heating a mixture of carbon dioxide and hydrogen in the presence of a catalyst to 1000–1200° C. whereby carbon monoxide and water are formed, rapidly cooling the gaseous mixture to below 100° C., whereby the water formed in the reaction is condensed, and removing the condensed water.

6. A process for the production of carbon monoxide which consists in rapidly heating a mixture of carbon dioxide and hydrogen in the presence of a catalyst to 1000–1200° C., rapidly cooling the gaseous mixture to below 100° C., removing the condensed water, and continuing rapidly the alternate heating and cooling of the gaseous mixture for the further production of carbon monoxide.

In testimony whereof I affix my signature.

WILLIAM C. ARSEM.